(12) United States Patent
Kim et al.

(10) Patent No.: US 10,687,378 B2
(45) Date of Patent: Jun. 16, 2020

(54) METHOD FOR COMMUNICATING IN MULTI-CONNECTION BASED MOBILE COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventors: Sung Kyung Kim, Daejeon (KR); Young Jick Bahg, Daejeon (KR); Jee Hyeon Na, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1 day.

(21) Appl. No.: 16/184,349

(22) Filed: Nov. 8, 2018

(65) Prior Publication Data

US 2019/0166641 A1 May 30, 2019

(30) Foreign Application Priority Data

Nov. 27, 2017 (KR) .................. 10-2017-0159377
Oct. 2, 2018 (KR) .................. 10-2018-0117371

(51) Int. Cl.
| | | |
|---|---|---|
| *H04W 76/15* | (2018.01) | |
| *H04L 5/00* | (2006.01) | |
| *H04L 12/851* | (2013.01) | |
| *H04L 1/00* | (2006.01) | |
| *H04W 88/06* | (2009.01) | |

(Continued)

(52) U.S. Cl.
CPC ............ *H04W 76/15* (2018.02); *H04L 1/00* (2013.01); *H04L 5/0053* (2013.01); *H04L 47/24* (2013.01); *H04L 5/001* (2013.01); *H04L 5/0023* (2013.01); *H04L 5/0035* (2013.01); *H04L 5/0055* (2013.01); *H04L 5/0091* (2013.01);

(Continued)

(58) Field of Classification Search
None
See application file for complete search history.

(56) References Cited

U.S. PATENT DOCUMENTS

| | | | |
|---|---|---|---|
| 2012/0076099 A1* | 3/2012 | Yin | ............... H04L 12/4633 370/329 |
| 2012/0231828 A1* | 9/2012 | Wang | ............... H04W 74/06 455/509 |

(Continued)

FOREIGN PATENT DOCUMENTS

| | | |
|---|---|---|
| WO | 2015/113625 A1 | 8/2015 |
| WO | 2016/095078 A1 | 6/2016 |
| WO | 2016/186401 A1 | 11/2016 |

*Primary Examiner* — Xavier S Wong
(74) *Attorney, Agent, or Firm* — LRK Patent Law Firm

(57) ABSTRACT

An operation method of a transmitting apparatus in a multi-connection based mobile communication system includes generating combined data by combining data and an extended information element (IE), when the data received from a serving gate way (SGW) or a core network is determined to be transmitted to a receiving apparatus; transmitting the combined data to the receiving apparatus; and receiving, from the receiving apparatus, feedback information indicating whether or not the receiving apparatus normally receives the combined data.

16 Claims, 8 Drawing Sheets

(51) Int. Cl.
*H04W 88/16* (2009.01)
*H04W 80/02* (2009.01)

(52) U.S. Cl.
CPC ............ *H04W 80/02* (2013.01); *H04W 88/06* (2013.01); *H04W 88/16* (2013.01)

(56) References Cited

U.S. PATENT DOCUMENTS

| | | | |
|---|---|---|---|
| 2015/0043435 A1* | 2/2015 | Blankenship | H04L 69/322 370/329 |
| 2015/0043492 A1 | 2/2015 | Baek et al. | |
| 2015/0208313 A1 | 7/2015 | Yie et al. | |
| 2015/0264562 A1* | 9/2015 | Wu | H04W 12/04 380/270 |
| 2015/0326456 A1* | 11/2015 | Dudda | H04L 47/14 370/252 |
| 2017/0164419 A1 | 6/2017 | Kim | |
| 2017/0215225 A1 | 7/2017 | Yi et al. | |
| 2017/0222876 A1 | 8/2017 | Van Der Velde et al. | |
| 2018/0007536 A1 | 1/2018 | Xu et al. | |

\* cited by examiner

METHOD FOR COMMUNICATING IN MULTI-CONNECTION BASED MOBILE COMMUNICATION SYSTEM AND APPARATUS FOR THE SAME

CROSS-REFERENCE TO RELATED APPLICATIONS

This application claims priorities to Korean Patent Application Nos. 10-2017-0159377, filed Nov. 27, 2017, and 10-2018-0117371, filed Oct. 2, 2018, in the Korean Intellectual Property Office (KIPO), the entire contents of which are hereby incorporated by reference.

BACKGROUND

1. Field of the Invention

The present disclosure relates to a method for transmitting and receiving data in a mobile communication system, and more particularly, to a method and an apparatus for data communications for managing a quality of service (QoS) of a terminal in a multi-connection based communication environment.

2. Description of Related Art

The 5th generation mobile communication system, which aims at supporting a giga bps (Gbps) class data rate which is at least 10 to 100 times data transmission rate than the 4th generation mobile communication, is actively being studied. Also, a dual connectivity (DC) based mobile communication system is attracting attention, and the DC is a technique for increasing transmission efficiency for a terminal by simultaneously using radio resources provided by a master base station (e.g., a master eNodeB (MeNB)) and a secondary base station (e.g., a secondary eNodeB (SeNB)).

In addition, the 5G generation mobile communication system is designed to support various communication infrastructures based on information and communications technologies (ICT) convergence. For this, it is also required to design the 5G mobile communication system so that connections with the 4G mobile communication system and the wireless LAN (WiFi) system are supported. Also, upper layer functions and lower layer functions of a base station may be split into separate units. That is, a unit referred to as a central unit (CU) may be responsible for the upper layer functions, and a unit referred to as a distributed unit (DU) may be responsible for the lower layer functions.

In a multi-connection based communication system including such the separated type base stations, in order to transmit and receive data between communication nodes without errors, required is a communication method of efficiently controlling an end-to-end quality of service (QoS) of a terminal for user plane data transfers between the communication nodes.

SUMMARY

In order to solve the above-described problem, embodiments of the present disclosure provide an operation method of a transmitting apparatus for efficiently controlling an end-to-end QoS of a terminal through user plane data transfers between communication nodes in a multi-connection based communication system including separated type base stations.

In order to solve the above-described problem, embodiments of the present disclosure also provide an operation method of a receiving apparatus for efficiently controlling an end-to-end QoS of a terminal through user plane data transfers between communication nodes in a multi-connection based communication system including separated type base stations.

In order to solve the above-described problem, embodiments of the present disclosure also provide a transmitting apparatus for efficiently controlling an end-to-end QoS of a terminal through a user plane data transfer between communication nodes in a multi-connection based communication system including separated type base stations.

In order to achieve the objective of the present disclosure, an operation method of a transmitting apparatus in a multi-connection based mobile communication system may comprise generating combined data by combining data and an extended information element (IE), when the data received from a serving gate way (SGW) or a core network is determined to be transmitted to a receiving apparatus; transmitting the combined data to the receiving apparatus; and receiving, from the receiving apparatus, feedback information indicating whether or not the receiving apparatus normally receives the combined data.

The extended IE may include at least one of a maximum delivery status protocol data unit (PDU) interval IE (maximum_delivery_status_PDU_interval), a delivery status PDU counter IE (delivery_status_PDU_counter), and a transmission-completed packet IE (TX_done_packet_information).

The operation method may further comprise, when the extended IE includes updated information for a maximum delivery status PDU interval, activating an acknowledgement (ACK) feedback waiting timer (ACK_feedback_waiting_timer) for the data.

The operation method may further comprise, when the feedback information indicates an ACK, stopping the ACK feedback waiting timer for the combined data and deleting the combined data from a buffer.

The feedback information may be included in a delivery status PDU received from the receiving apparatus.

The operation method may further comprise, when the delivery status PDU includes a delivery status PDU counter configured by the receiving apparatus, storing the delivery status PDU counter; comparing the stored delivery status PDU counter with a delivery status PDU counter subsequently received from the receiving apparatus; determining whether the subsequently-received delivery status PDU is a new delivery status PDU or not based on a result of the comparing; and in response to determining that the subsequently-received delivery status PDU is a new delivery status PDU, updating the deliver status PDU counter.

The operation method may further comprise, when the feedback information included in the delivery status PDU indicates a negative acknowledgement (NACK), determining whether to retransmit the data directly to a terminal; and when the data is determined to be retransmitted directly to the terminal, stopping the ACK feedback waiting timer and transmitting to the terminal the data to which the transmission-completed packet IE is added.

The operation method may further comprise, when the ACK feedback waiting timer expires, updating the transmission-completed packet IE and retransmit the data to the terminal.

The data transmitted to the receiving apparatus may be transmitted through at least one of an X2 interface, an Xn interface, and a new radio user plane (NR-U) interface.

In order to achieve the objective of the present disclosure, an operation method of a receiving apparatus in a multi-connection based mobile communication system may comprise identifying a type of an extended information element (IE) of data received from the transmitting apparatus; updating feedback information indicating whether or not the data is normally received by determining whether or not a data loss exists based on a sequence number of the data; and when a data loss is not identified based on the determining, activating a next feedback transmission timer and triggering a feedback indicating whether or not the data is normally received.

The data may be received from the transmitting apparatus through at least one of an X2 interface, an Xn interface, and a new radio user plane (NR-U) interface.

The operation method may further comprise, when a data loss is identified based on the determining, activating a discard timer for data in which the data loss occurs.

The operation method may further comprise, when the discard timer expires, deleting a negative acknowledgement (NACK) feedback information for the data in which the data loss occurs.

The operation method may further comprise, when the next feedback transmission timer expires or the feedback indicating whether or not the data is normally received is triggered, stopping the next feedback transmission timer; and transmitting a new delivery status protocol data unit (PDU) to the transmitting apparatus.

The operation method may further comprise, when the extended IE includes a transmission delivery status PDU counter IE, determining whether a value of the transmission delivery status PDU counter IE is identical to a value of a previous transmission delivery status PDU counter; deleting previous NACK feedback information in response to determining that the value of the transmission delivery status PDU counter IE is identical to the value of the previous transmission delivery status PDU counter; and increasing the transmission delivery status PDU counter by 1.

The operation method may further comprise, when the extended IE includes a transmission-completed packet IE (TX done packet information), deleting information on data related to the transmission-completed packet IE.

The operation method may further comprise, when the extended IE includes a maximum delivery status PDU interval IE (maximum_delivery_status_PDU_interval), updating a maximum allowable feedback time.

In order to achieve the objective of the present disclosure, a transmitting apparatus in a multi-connection based mobile communication system may comprise at least one processor, a memory storing at least one instruction executed by the at least one processor, and a transceiver controlled by the at least one processor. Also, the at least one instruction may be configured to generate combined data by combining data and an extended information element (IE), when the data received from a serving gate way (SGW) or a core network is determined to be transmitted to a receiving apparatus; transmit the combined data to the receiving apparatus; and receive, from the receiving apparatus, feedback information indicating whether or not the receiving apparatus normally receives the combined data.

The extended IE may include at least one of a maximum delivery status protocol data unit (PDU) interval IE (maximum_delivery_status_PDU_interval), a delivery status PDU counter IE (delivery status PDU counter), and a transmission-completed packet IE (TX_done_packet_information).

The at least one instruction may be further configured to, when the extended IE includes updated information for a maximum delivery status PDU interval, activate an acknowledgement (ACK) feedback waiting timer (ACK_feedback_waiting_timer) for the data.

According to the embodiments of the present disclosure, the end-to-end QoS of the terminal can be efficiently controlled through user plane data transfers between communication nodes in a multi-connection based mobile communication system which may also include at least one separated type base station.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
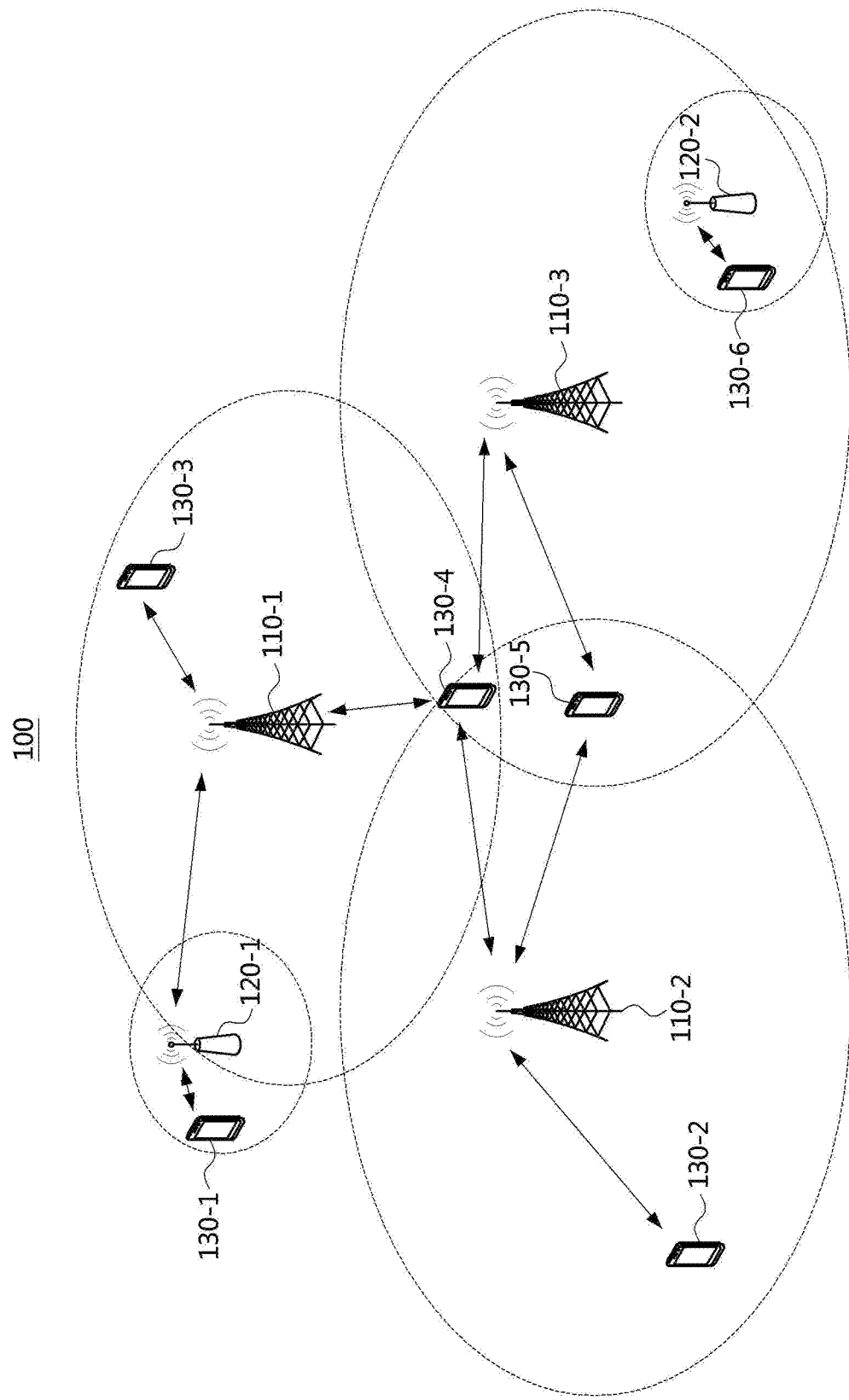
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may also be referred to as a 'communication network'. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
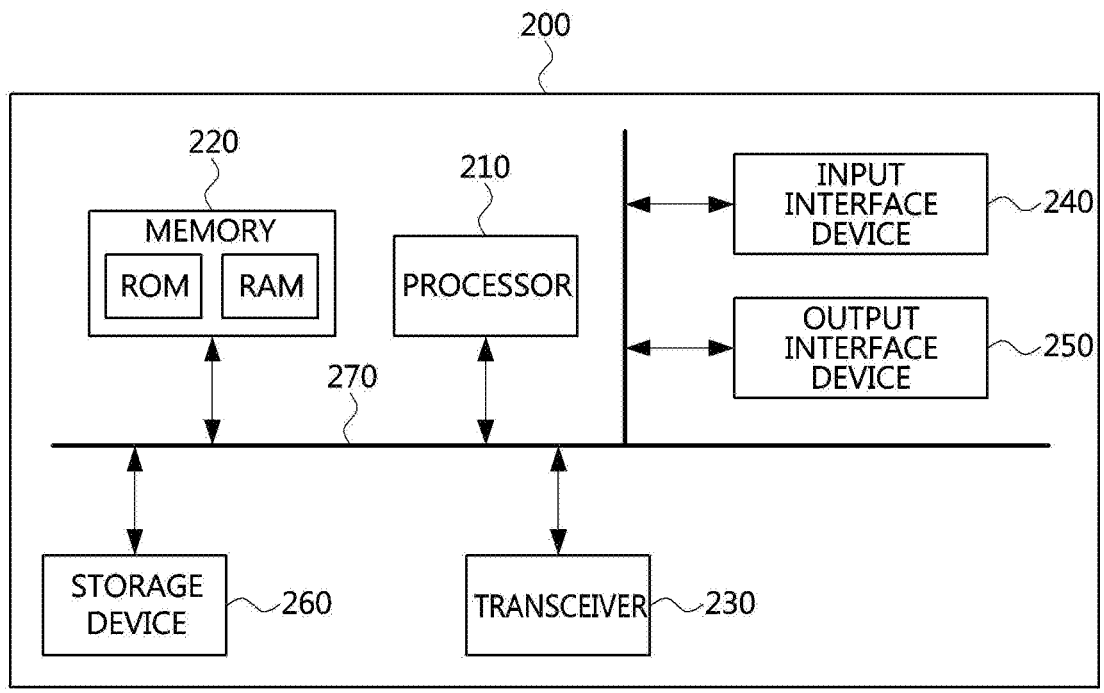
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-eNB, a base transceiver station (BTS), a radio base station, a radio transceiver, an access point, an access node, a road side unit (RSU), a radio remote head (RRH), a transmission point (TP), a transmission and reception point (TRP), a flexible TRP (f-TRP), gNB, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, a device supporting internet of things (IoT) functions, a mounted module/device/terminal, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, multi-connection based mobile communication technologies will be described. Here, even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Also, data may also refer to a packet, a data packet, or a protocol data unit (PDU). The packet may mean the data itself or a portion corresponding to a payload that is distinguished from a header in the data.

As described above, the fifth generation mobile communication (hereinafter referred to simply as a '5G') is being designed to support various communication infrastructures based on the ICT convergence. The 3GPP new radio (NR) is one of the standard specifications for the construction of the 5G mobile communication system.

A radio access network (RAN) of the NR (i.e., NR RAN) is a new radio access network for supporting both the evolved universal terrestrial radio access network (E-UTRA), which is the evolved 4G mobile communication system (hereinafter referred to as '4G') and the NR. That is, the NR is not aimed to operate as a solely operated system, but aimed to be connected to the conventional mobile communication system and the wireless communication system such as the third generation mobile communication system and the WiFi communication system as well as the conventional 4G system. The following describes whether or not functions of a base station are separated in the NR, and the NR RAN types according to whether to interwork with a 4G base station.

Figure 3A:
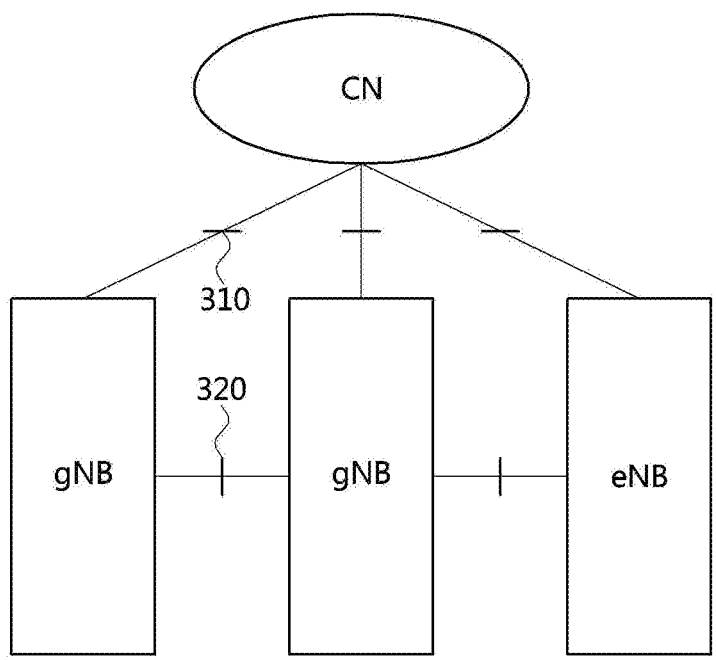
FIG. 3A is a conceptual diagram for explaining a deployment type of an integrated base station, which is being considered in the NR.
Figure 3B:
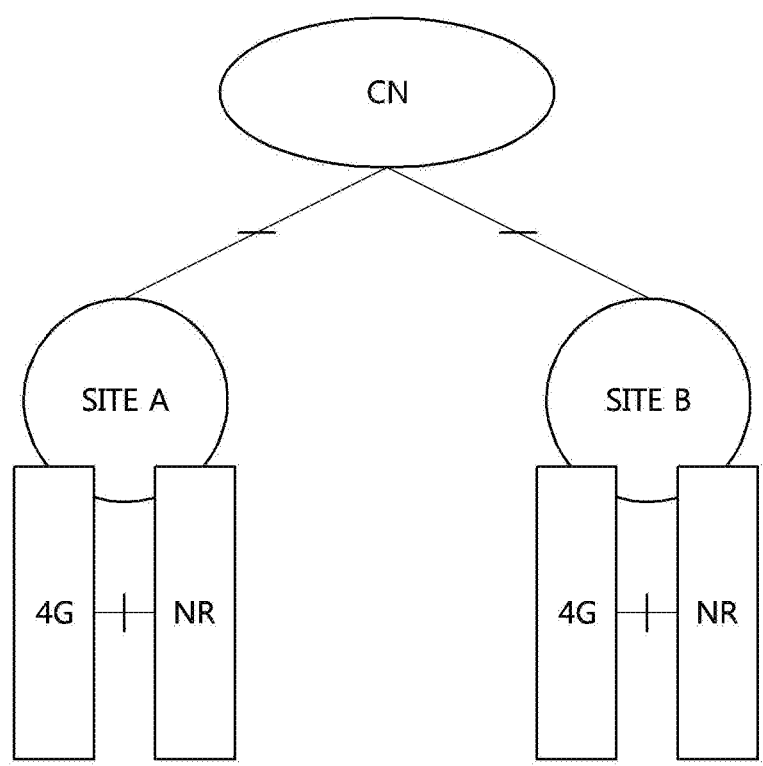
FIG. 3B is a conceptual diagram for explaining a deployment type in which base station functions are located in the same site, which is being considered in the NR.
Figure 3C:
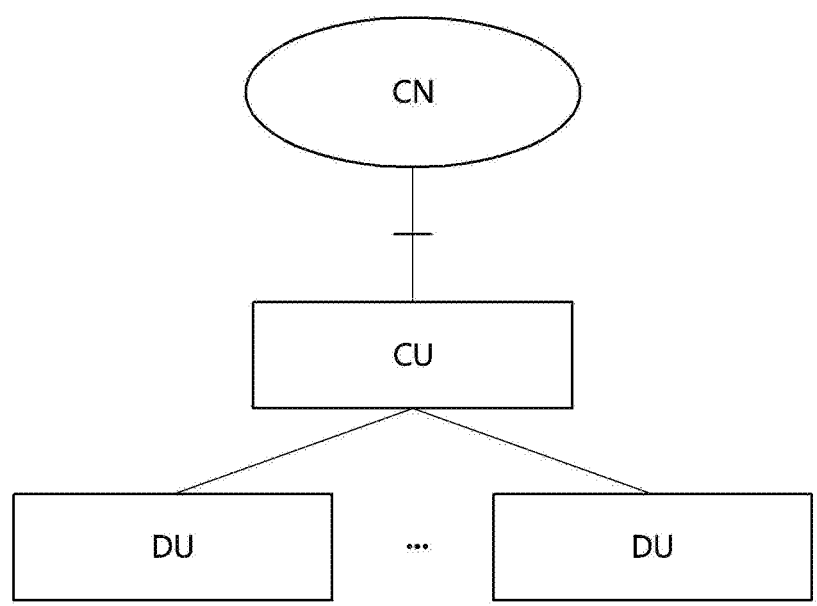
FIG. 3C is a conceptual diagram for explaining a deployment type in which base station functions are separated, which is being considered in the NR.

FIG. 3A is a conceptual diagram for explaining a deployment type of an integrated base station, which is being considered in the NR, FIG. 3B is a conceptual diagram for explaining a deployment type in which base station functions are located in the same site, which is being considered in the NR, and FIG. 3C is a conceptual diagram for explaining a deployment type in which base station functions are separated, which is being considered in the NR.

Referring to FIG. 3A, illustrated is a deployment type of an integrated type base station in which a next generation NodeB (hereinafter referred to as a 'gNB') is formed in the integrated manner without being split into a central unit (CU) and a distributed unit (DU). Here, the gNB may mean an NR base station. All the protocol stacks are supported in the gNB. Also, the gNB is connected to a core network (CN) through a RAN-CN interface 310, and connected to another base station or a 4G base station (e.g., eNB) through an inter-base station interface 320.

Referring to FIG. 3B, a deployment in which the NR and the 4G are supported in the same site is illustrated. This deployment may be suitable for a macro environment of a metro city. With this deployment, load balancing and multi-access functions may be used to utilize all of 4G and 5G frequency resources and expand cell coverage by adjusting the shape of the base station.

Referring to FIG. 3C, it is illustrated that the gNB is operated by being split into a CU and at least one DU. The CU is responsible for upper layer functions of the base station and each of at least one DU is responsible for lower layer functions of the base station. In such the separated operation, when transport apparatuses connecting such the units require a high performance, the CU may accommodate a number of functions from the upper layer to the lower layer, and the DU may accommodate only a relatively small number of the lower layer functions.

Accordingly, the processing load of the CU may be heavy and it may be not easy to satisfy the transmission capacity, delay and synchronization requirements of the transport apparatuses. On the other hand, in this case, since the transmission delay is short, using an optimal scheduling scheme has an advantage that cooperative communications (e.g., coordinated multi-point (CoMP) communications) between the base stations can be realized more easily.

When the transport apparatuses have a low performance, the CU may be responsible for only upper layer protocol functions with a less processing load, so that there is a room in the transport capacity or delay requirements of the transport apparatuses. Next, an inter radio access technology (inter-RAT) dual connectivity (DC) technique between the NR and the 4G will be described. First, the conventional DC technique will be described.

Figure 4:
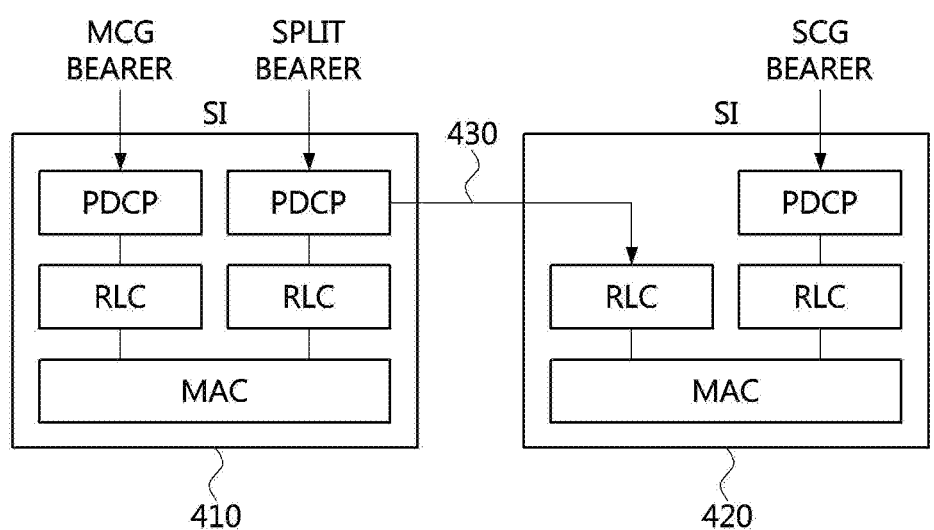
FIG. 4 is a conceptual diagram for explaining a conventional dual connectivity technique.

FIG. 4 is a conceptual diagram for explaining a conventional dual connectivity technique.

Referring to FIG. 4, a processing of a user plane (UP) protocol stack through an X2 interface 430 between a master eNB (MeNB) 410 and a secondary eNB (SeNB) 420, according to the type of a bearer, is illustrated. Here, the X2 interface 430 between the MeNB 410 and the SeNB 420 may be a non-ideal link, and bidirectional transmission between both base stations may fail.

The DC is a technology for allowing a terminal having a wireless communication link established with a macro base station to move within a coverage of a micro cell to receive a high-speed data service through the micro cell. The DC bearer types in the 3GPP LTE and LTE-A may include a master cell group (MCG) bearer transmitted through radio resources of the MeNB, a secondary cell group (SCG) bearer transmitted through radio resources of the SeNB, and a split bearer using all of the radio resources of the MeNB and the SeNB.

In the case of the SCG bearer, downlink data may be directly transmitted from a serving gateway (SGW) to the SeNB 420. In the case of the split bearer, data of the spilt bearer may be transmitted from the SGW (not shown) to the SeNB 420 after passing through a packet data convergence protocol (PDCP) of the MeNB 410. Here, when the MeNB 410 transfers the data to the SeNB 420, the MeNB 410 may buffer the data transmitted to the SeNB 420 against data loss, and provide retransmission when it is necessary to retransmit the data.

When the DC data has been successfully transmitted to a terminal (not shown) through the above procedure, the SeNB 420 may transmit a feedback including a sequence number of the corresponding data to the MeNB 410. Meanwhile, data transmission and reception between the MeNB and the SeNB in the 3GPP LTE and LTE-A systems may use the X2 interface. The X2 interface may operate by using a GPRS tunneling protocol (GTP), and a GTP PDU may include the data packet to be transmitted and delivery status information in a RAN container. Next, an inter-RAT DC technique between the NR and the 4G will be described.

Figure 5:
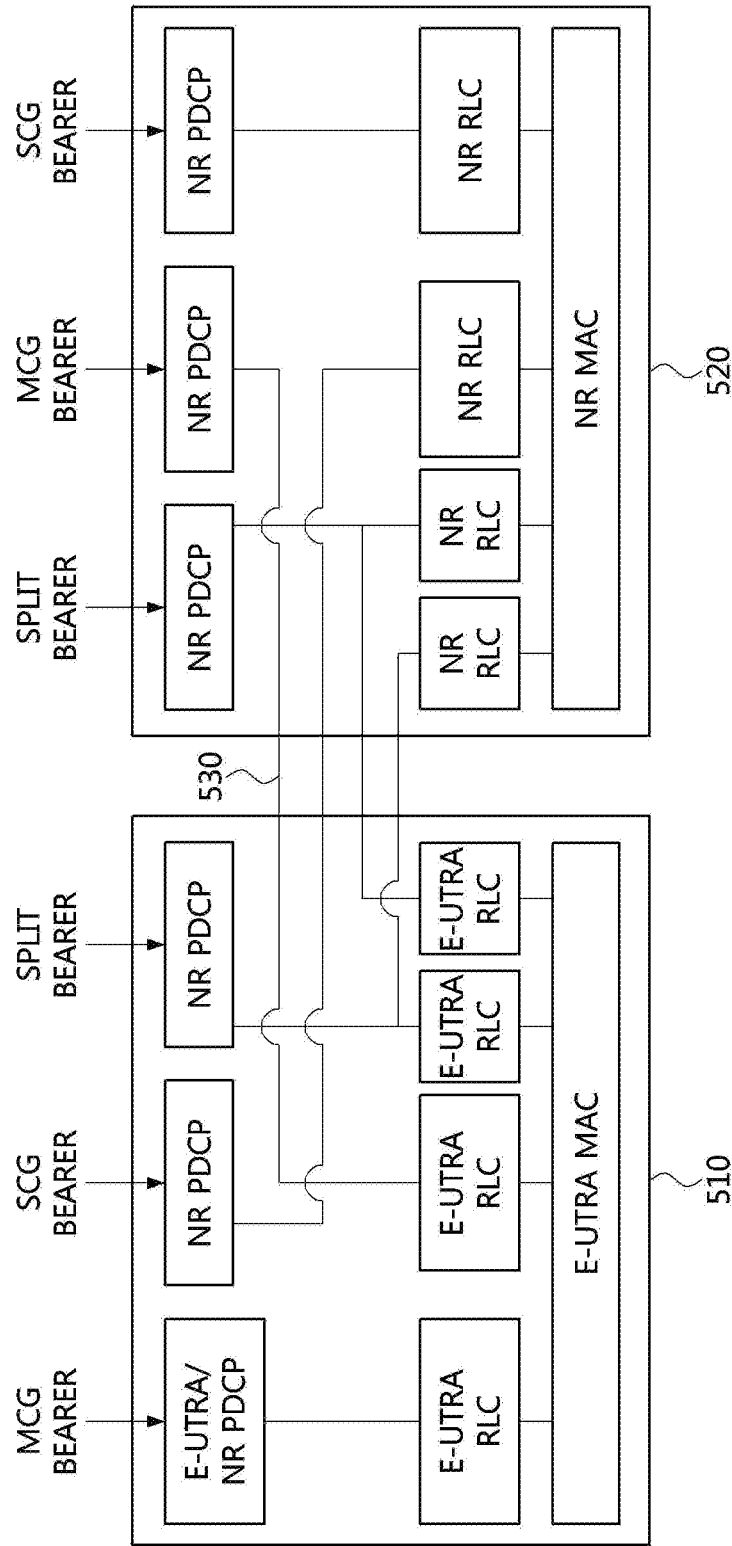
FIG. 5 is a conceptual diagram illustrating multi-RAT dual connectivity support between 4G and 5G in the NR.

FIG. 5 is a conceptual diagram illustrating multi-RAT dual connectivity support between 4G and 5G in the NR.

Referring to FIG. 5, illustrated is a network architecture for supporting a DC technology between a base station supporting the conventional 3GPP LTE/LTE-A and a base station supporting the NR. As described above, in order to provide early commercialization through utilization of the 3GPP LTE and LTE-A systems, which are conventionally known as the 4G mobile communication systems, a multi-RAT dual connectivity (MR-DC) between an eNB for the LTE/LTE-A and a gNB for the NR is being considered.

For example, an E-UTRAN NR DC (EN-DC) in which an eNB is used as a master nodeB (MN) and a gNB is used as a secondary nodeB (SN), and an NR E-UTRAN DC (NE-DC) in which a gNB is used as an MN and an eNB is used as an SN may be considered. Also, various types of the MR-DC may be considered. In the MR-DC, as an interface for transmitting and receiving user data between the MN and the SN, an X2 interface or an Xn interface may be used.

Also, a bearer may be classified into a MN terminated bearer and a SN terminated bearer according to whether a user plane (UP) connection with a core network is connected through the MN or the SN (i.e., depending on whether a PDCP entity is in the MN or the SN).

The EN-DC concept of FIG. 5 illustrates a user plane (UP) protocol for a MR-DC bearer between the MN 510 and the SN 520. When any one of an MN terminated SCG bearer, an SN terminated MCG bearer, and an SN/MN terminated split bearer is configured, user data for the corresponding bearer may be transmitted and received between the MN and the SN. Next, a dual connectivity technique through a functional split of the base station in the NR will be described.

Figure 6:
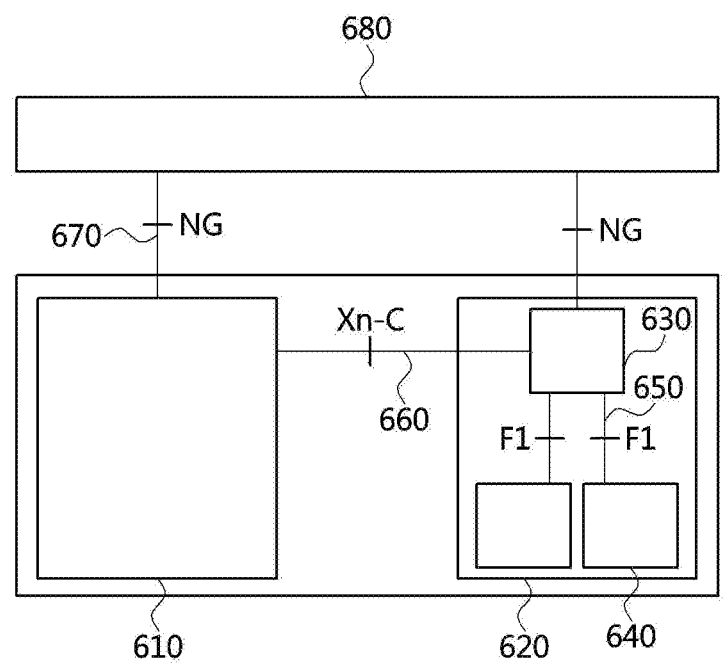
FIG. 6 is a conceptual diagram for explaining a dual connectivity technique through a functional split of an NR base station.

FIG. 6 is a conceptual diagram for explaining a dual connectivity technique through a functional split of an NR base station.

Referring to FIG. 6, illustrated is a case in which a gNB 620 corresponding to an NR base station is split into a CU 630 and a DU 640, and they support dual connectivity together with a 5GC 680 which is an NR core network and a non-split base station gNB 610. As described above, the NR supports the base station functional split into the CU and the DU and considers an interface therefor. Here, an interface between the CU and the DU may be defined as a F1 interface 650.

The F1 interface may support separation of a control plane (CP) and the UP, and enable exchange of terminal related information (i.e., UE associated information) and non-UE associated information. An interface in the UP may be referred to as a 'F1-U', and may be defined for user data transfers between a PDCP entity of the CU and a radio link control (RLC) entity of the DU.

The Xn interface may be an interface between a gNB and another gNB (or, a next generation eNB (ng-eNB)). Specifically, the Xn interface may be classified into an Xn-U interface for the UP, and an Xn-C interface for the CP 660. Also, an NG interface 670 may be an interface for supporting signaling information exchange between the NG-RAN and the 5G CN (5GC) 680.

Meanwhile, a data packet transmitted and received on a new Xn interface of the NR (also referred to as a 'new radio user plane (NR-U)' interface) has a 3-byte NR-U sequence number. When a receiving base station identifies that a sequence number of a data received from a transmitting base station is a non-sequential sequence number, the receiving base station may recognize that a loss occurs in the corresponding data on a radio link, and request a data retransmission for the corresponding sequence number to the base station. In this case, the receiving base station may give a feedback including the sequence number corresponding to the data in which the loss occurs to the transmitting base station.

Table 1 shows an example of a format of a downlink user data PDU (PDU_TYPE_0) for data transmitted through the NR-U interface. The NR-U sequence number of 3 octets may represent a sequence number of the currently-transmitted data.

TABLE 1

| Bits | | | | | | | | number |
|---|---|---|---|---|---|---|---|---|
| 7 | 6 | 5 | 4 | 3 | 2 | 1 | 0 | of octets |
| PDU type (=0) | | | Spare | DL Discard Blocks | | DL Flush | Report polling | 1 |
| Spare | | | | | Assistance Information Report Polling Flag | | Retransmission flag | 1 |
| NR-U sequence number | | | | | | | | 3 |
| DL discard NR PDCP PDU sequence number | | | | | | | | 0 or 3 |
| DL discard Number of blocks | | | | | | | | 0 or 1 |

TABLE 1-continued

| Bits | | | | | | | | number |
|---|---|---|---|---|---|---|---|---|
| 7 | 6 | 5 | 4 | 3 | 2 | 1 | 0 | of octets |
| DL discard NR PDCP PDU sequence number start (first block) | | | | | | | | 0 or 3 |
| Discarded Block size (first block) | | | | | | | | 0 or 1 |
| ... | | | | | | | | |
| DL discard NR PDCP PDU sequence number start (last block)) | | | | | | | | 0 or 3 |
| Discarded Block size (last block) | | | | | | | | 0 or 1 |
| Padding | | | | | | | | 0-3 |

Table 2 shows an example of a format of a downlink data delivery status PDU (PDU_TYPE_1) for requesting retransmission of the data packet in which a loss occurs.

TABLE 2

| Bits | | | | | | | | number |
|---|---|---|---|---|---|---|---|---|
| 7 | 6 | 5 | 4 | 3 | 2 | 1 | 0 | of octets |
| PDU type (=1) | | | | Highest Transmitted NR PDCP sequence number Ind. | Highest Delivered NR PDCP sequence number Ind. | Final Frame Ind. | Lost Packet Report | 1 |
| Spare | | | | Data rate Ind. | Highest Retransmitted NR PDCP sequence number Ind. | Highest Delivered Retransmited NR PDCP sequence number Ind. | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6 × (number of reported lost NR-U sequence number ranges)) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Highest successfully delivered retransmitted NR PDCP Sequence Number | | | | | | | | 0 or 3 |
| Highest retransmitted NR PDCP Sequence Number | | | | | | | | 0 or 3 |
| Padding | | | | | | | | 0-3 |

The transmitting base station may delete the transmitted data from a retransmission buffer by using the downlink data delivery status information, which is information fed back from the receiving base station, and may retransmit data requested to be retransmitted to the receiving base station based on a configured maximum retransmission count and a delivery status feedback cycle, or the like.

A new data communication method is required to provide a low-latency data service to a terminal, which is an essential requirement of the 5G mobile communication system under the new type of mobile communication environments such as the MR-DC and the base station functional split.

In particular, a data communication method for preventing an end-to-end transmission delay due to a transmission error on the X2 (or Xn) interface between the base stations in the MR-DC system, and a data communication method for ensuring an end-to-end QoS in the case of using the separated type base station may be required. Next, a method for data communications between multi-connection base stations according an embodiment of the present invention, which ensures the end-to-end QoS under the new type of mobile communication environment such as the MR-DC and the base station function split, will be described.

Figure 7:
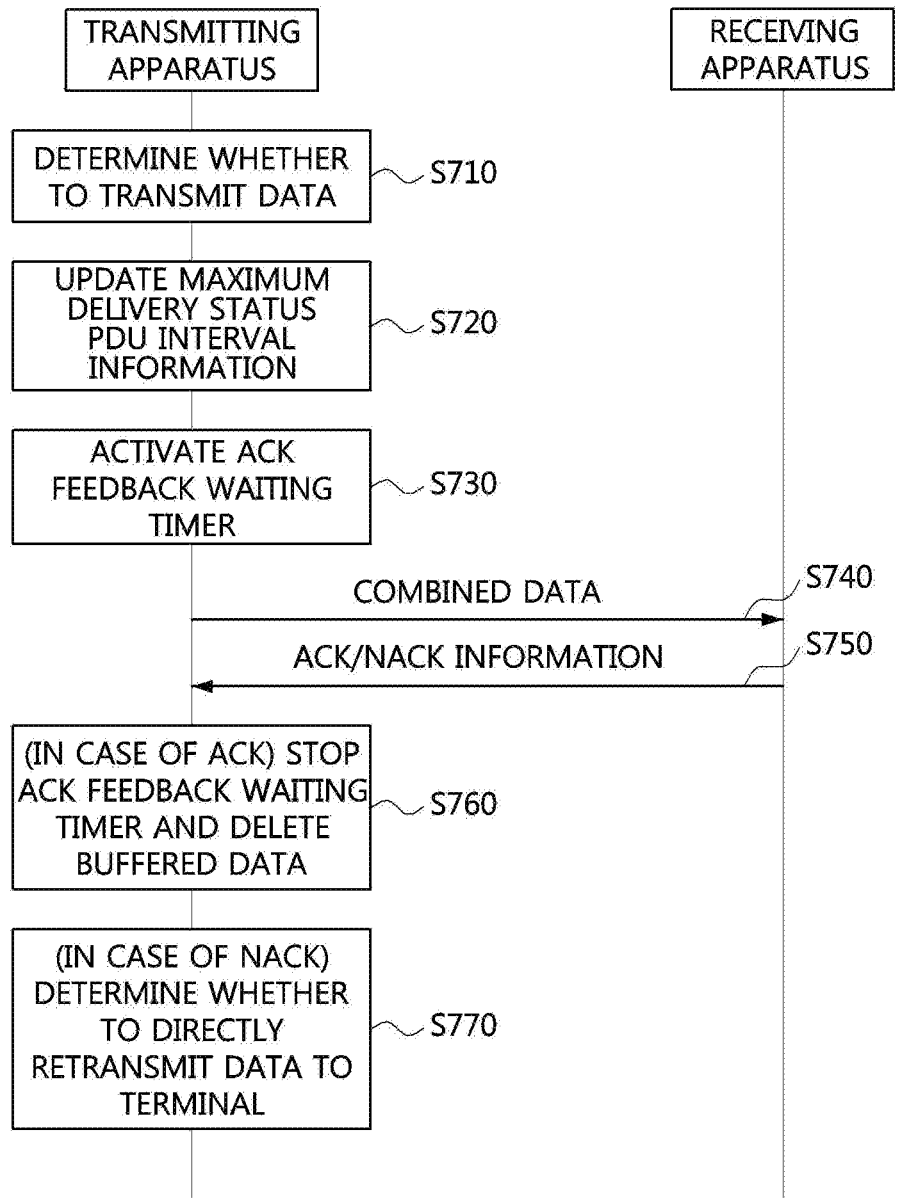
FIG. 7 is a sequence chart illustrating a data communication method between multi-connection base stations according to an embodiment of the present invention.

FIG. 7 is a sequence chart illustrating a data communication method between multi-connection base stations according to an embodiment of the present invention.

Referring to FIG. 7, illustrated is a data transceiving operation of a transmitting apparatus corresponding to a base station having a PDCP entity transferring UP data, and a receiving apparatus corresponding to another base station receiving the UP data and transmitting a feedback of a reception state. Here, each of the base stations corresponding to the transmitting apparatus and the receiving apparatus may be an eNB or a gNB (e.g., a separated type gNB having the F1 interface). That is, each of the transmitting apparatus and the receiving apparatus may be one of the base stations in the MR-DC environment including EN-DC, NGEN-DC, and NE-DC.

As described above, the data in the following embodiments may mean a packet, a data packet, or a PDU. The packet may mean the data itself or a portion corresponding to a payload that is distinguished from a header in the data.

The transmitting apparatus corresponding to the eNB or gNB may determine whether to transmit a data received from the SGW (or the core network) to the receiving apparatus corresponding to the eNB or the gNB (S710).

When it is determined to transmit the data to the receiving apparatus, the transmitting data may generate a combined data by combining the data and at least one extended information element (IE) (hereinafter referred to as 'Extended_IE'). The Extended_IE may include a maximum delivery status PDU interval IE (maximum_delivery_status_PDU_interval), a delivery status PDU counter IE (delivery_status_PDU_counter), a transmission-completed packet IE (TX_done_packet_information), and the like. Next, an embodiment of the present invention will be described with reference to a case where the Extended_IE includes the maximum delivery status PDU interval IE in the transmitting apparatus.

When the transmitting apparatus determines to transmit the data to the receiving apparatus, it may be determined whether it is necessary to change a maximum delivery status PDU interval during which the transmitting apparatus desires to receive feedback information indicating whether or not the data transmitted by the transmitting apparatus is normally received at the receiving apparatus. Here, the feedback information may be received as included in a delivery status PDU received from the receiving apparatus. This will be described later.

When it is determined to be necessary to change the maximum delivery status PDU interval, the maximum delivery status PDU interval may be changed by reflecting information indicating the change of the maximum delivery status PDU interval to the Extended_IE of the downlink user data PDU (PDU_type_0) (S720). Then, the transmitting apparatus may activate at ACK feedback waiting timer (ACK_feedback_waiting_timer) (S730).

Then, the Extended_IE such as the delivery status PDU counter IE (delivery_status_PDU_counter) and the transmission-completed packet IE (TX_done_packet_information) may be updated and added to the data, and the combined data in which the data and the Extended_IE are combined may be generated. Here, in order to distinguish from the data transferred from the SGW or the core network, the data combined with the Extended_IE may be referred to as the 'combined data'.

Table 3 below shows the types of Extended_IEs according to an embodiment of the present disclosure. The hexadecimal values and magnitudes for the Extended_IE types of Table 1 are values according to only an embodiment of the present disclosure, and they may be configured variously.

TABLE 3

| Extended_IE type | Description | Size |
|---|---|---|
| 0x00 | None | — |
| 0x01 | delivery_status_PDU_counter | 1 byte |
| 0x10 | TX_done_packet_information | variable |
| 0x11 | maximum_delivery_status_PDU_interval | 1 byte |

Table 4 below shows an example in which the delivery status PDU counter IE among the Extended_IEs according to an embodiment of the present disclosure is reflected in the downlink data PDU format.

TABLE 4

| Bits | | | | | | | | Number of |
|---|---|---|---|---|---|---|---|---|
| 7 | 6 | 5 | 4 | 3 | 2 | 1 | 0 | octets |
| Delivery Status PDU Counter | | | | | Next Extended_IE type | | | 1 |

Table 5 below shows an example in which the transmission-completed packet IE among the Extended_IEs according to an embodiment of the present disclosure is reflected in the downlink data PDU format.

TABLE 5

| Bits | | | | | | | | Number of |
|---|---|---|---|---|---|---|---|---|
| 7 | 6 | 5 | 4 | 3 | 2 | 1 | 0 | octets |
| The number of TX Done packets | | | | | Next Extended_IE type | | | 1 |
| X2-U Sequence number | | | | | | | | 2 × (number of TX Done packets) |

Table 6 below shows an example in which the maximum delivery status PDU interval IE among the Extended_IEs according to an embodiment of the present disclosure is reflected in the downlink data PDU format.

TABLE 6

| Bits | | | | | | | | Number of |
|---|---|---|---|---|---|---|---|---|
| 7 | 6 | 5 | 4 | 3 | 2 | 1 | 0 | octets |
| Maximum Delivery Status PDU interval × 4 ms | | | | | Next Extended_IE type | | | 1 |

When there is no further Extended_IE to be added, the generated combined data may be transmitted to the receiving apparatus (S740). Here, the transmitting apparatus may transmit the combined data to the receiving apparatus via the inter-base station interface such as the Xn interface, the X2 interface, or the NR-U interface.

Table 7 below shows an example of a format of a downlink data PDU including the added Extended_IE(s) according to an embodiment of the present disclosure. That is, the Extended_IE may be added to the NR downlink user data PDU (PDU_TYPE_0) shown in Table 1.

TABLE 7

| Bits | | | | | | | | Number of |
|---|---|---|---|---|---|---|---|---|
| 7 | 6 | 5 | 4 | 3 | 2 | 1 | 0 | octets |
| PDU type (=0) | | | | spare | | Extended_IE type | | 1 |
| X2-U Sequence Number | | | | | | | | 2 |
| Extended_IE (if Extended_IE type 1, 2, or 3) | | | | | | | | 0 or variable |
| Spare extension | | | | | | | | 0-4 |

Next, the transmitting apparatus may receive from the receiving apparatus feedback information indicating whether the data transmitted by the transmitting apparatus is normally received or not (S750). The feedback information may be transmitted to the transmitting apparatus as included in the above-described data delivery status PDU.

Meanwhile, when the 'Report polling' field of the user data PDU (PDU_TYPE_0) in the combined data received from the transmitting apparatus is set to 'ON' (e.g., '1'), the receiving apparatus may transmit a delivery status PDU counter as included in the delivery status PDU when transmitting the delivery status PDU including the feedback information to the transmitting apparatus. Then, the transmitting apparatus receiving the delivery status PDU counter may store the delivery status PDU counter.

Thereafter, the transmitting apparatus may compare the stored value with a delivery status PDU counter included in a delivery status PDU subsequently received from the receiving apparatus, and determine whether the subsequently-received delivery status PDU is a new delivery status PDU based on the comparison. When it is determined that the new delivery status PDU is received, the delivery status PDU counter may be updated.

The feedback information indicating whether the data is normally received or not may be an acknowledgment (ACK) or negative acknowledgment (NACK).

The transmitting apparatus may identify a reception delivery status PDU counter in a delivery status PDU to determine whether the received feedback information is the first received feedback information, and when it is determined as the first, received feedback information, the transmitting apparatus may update the reception delivery status PDU counter by increasing the reception delivery status PDU counter by 1.

In the case that the feedback information indicates an ACK, the transmitting apparatus may stop the ACK feedback waiting timer for the data related to the ACK, and delete the corresponding data in the buffer (S760). Here, the steps (e.g., S730 and S760) related to the ACK feedback waiting timer may be omitted, and in this case, the operations related to the ACK feedback waiting timer may not be performed in the transmission apparatus.

In the case that the feedback information indicates a NACK, the transmitting apparatus may determine whether to directly retransmit the data related to the NACK to the terminal or to retransmit the data to the receiving apparatus (S770).

When it is possible to retransmit the data directly to the terminal by the transmitting apparatus, the ACK feedback waiting timer may be stopped and a transmission-completed packet IE (TX_done_packet_information) may be generated. Alternatively, when the ACK feedback wait timer expires, the transmitting apparatus may generate a transmission-completed packet IE for the data related to the corresponding ACK feedback waiting timer. The transmitting apparatus may directly retransmit the data reflecting the transmission-completed packet IE to the terminal.

That is, through the above-described procedure, the transmitting apparatus may determine whether to retransmit the data through the X2 (or, Xn or NR-U) interface in consideration of a data discarding time or a maximum allowable delay time. Here, the receiving apparatus may transmit the maximum delivery status PDU interval IE (maximum_delivery_status_PDU_interval) to the transmitting apparatus so that the transmitting apparatus can utilize the information to manage information on data loss.

Also, the transmitting apparatus may retransmit, directly to the terminal, the data for which the ACK feedback information is not received from the receiving apparatus. In this case, in order to notify the receiving apparatus that the corresponding data does not need to be transmitted to the terminal or that the request of the retransmission is stopped, the transmitting apparatus may transmit a sequence number of the corresponding data to the receiving apparatus. Next, a data communication method between multiple connection base stations in a receiving apparatus according to an embodiment of the present disclosure will be described.

Figure 8:
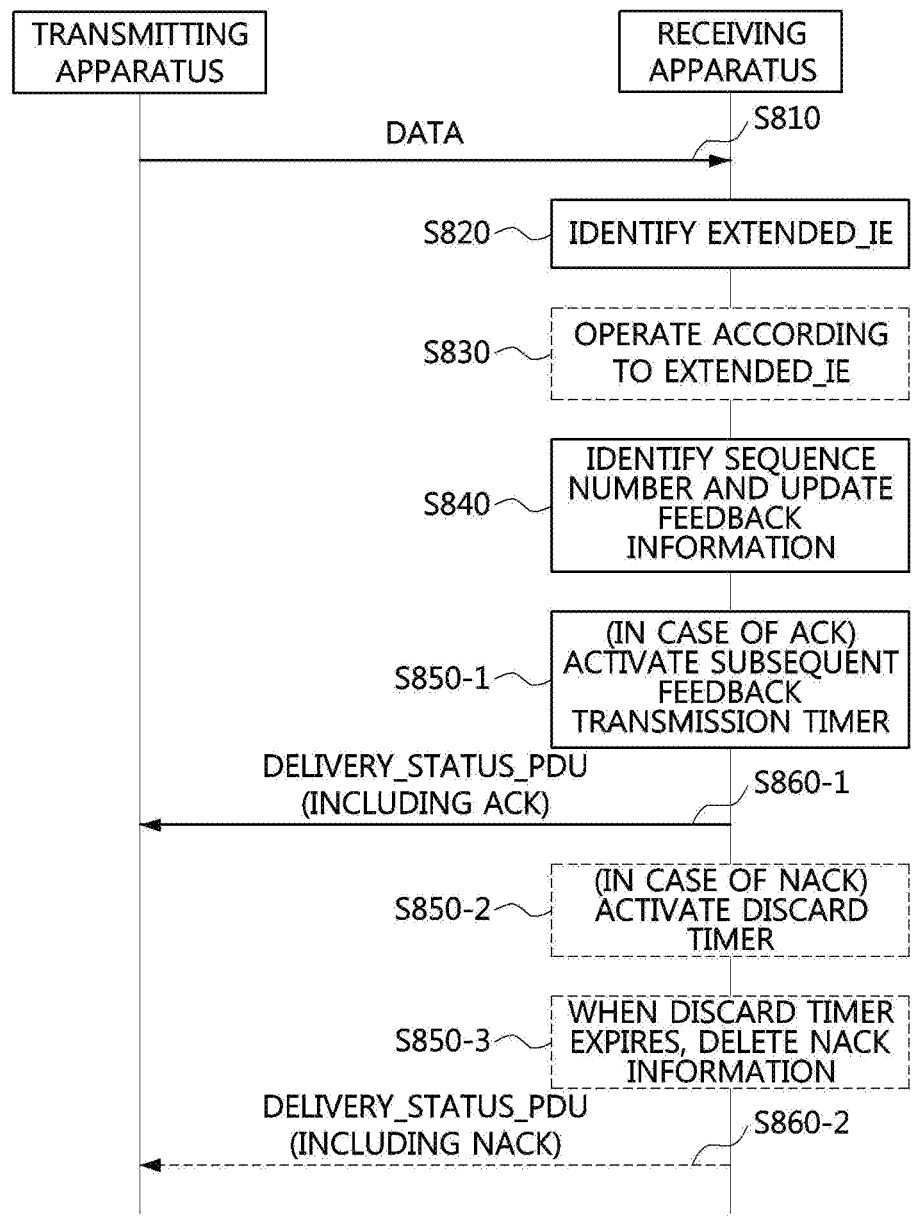
FIG. 8 is a sequence chart illustrating a data communication method between multi-connection base stations according to another embodiment of the present disclosure.

FIG. 8 is a sequence chart illustrating a data communication method between multi-connection base stations according to another embodiment of the present disclosure.

Referring to FIG. 8, illustrated is a case in which a receiving apparatus (e.g., corresponding to a base station receiving UP data and transmitting a feedback for a reception state of the UP data) receiving data transmitted by a transmitting apparatus (e.g., corresponding to a base station having a PDCP entity transferring the UP data) identifies the type of Extended_IE included in the data, and transmit to the transmitting apparatus feedback information indicating whether the data is normally received.

The transmitting apparatus corresponding to an eNB or a gNB may transmit data received from the SGW to the receiving apparatus corresponding to an eNB or a gNB (S810). Here, the transmitting apparatus may transmit the data to the receiving apparatus through an inter-base station interface such as the Xn interface, the X2 interface, or the NR-U interface.

The receiving apparatus may identify whether the received data includes an Extended_IE (S820). The receiving apparatus may perform an operation related to the type of the identified Extended_IE (S830). When the type of the identified Extended_IE is a transmission delivery status PDU counter IE (TX_delivery_status_PDU_counter), if a value of the IE is identical to a value of a recently-configured transmission delivery status PDU counter, the receiving apparatus may delete previous NACK feedback information, and increase the transmission delivery status PDU counter by 1.

That is, the receiving apparatus may assign the transmission delivery status PDU counter which is a unique identifier to a delivery status counter, each time the delivery status PDU including feedback information indicating a reception state of the received data is transmitted to the transmitting apparatus, and this value may be configured to be increased by 1 each time the delivery status PDU is transmitted.

Also, when the data transmitted from the transmitting apparatus includes a reception delivery status PDU counter IE (RX_delivery_status_PDU_counter), the receiving apparatus may identify a normal reception of the related delivery status PDU.

When the identified Extended_IE is a transmission-completed packet IE, the receiving apparatus may delete all information related to the data, and process the data as a normal reception (ACK).

On the other hand, when the identified Extended_IE is a maximum delivery status PDU interval IE (maximum delivery status PDU interval), the receiving apparatus may update a maximum allowable feedback time.

After identifying the Extended_IE, the receiving apparatus may check whether a missed data exists or not by identifying the sequence number, and accordingly, the receiving apparatus may update feedback information (S840). When a missed data is not identified, the receiving apparatus may activate a next feedback transmission timer (S850-1). When the next feedback transmission timer expires or the feedback is triggered by the transmitting apparatus, the receiving apparatus may transmit a new delivery status PDU after stopping the next feedback transmission timer (S860-1).

When a missed data is identified, the receiving apparatus may activate a discard timer for the missed data (S850-2). Then, when the discard timer expires, the receiving apparatus may delete the corresponding NACK feedback information (S850-3). The receiving apparatus may transmit a delivery status PDU including NACK feedback information to the transmitting information (S860-2).

Table 8 below shows an example of a format of a downlink data delivery status PDU including an Extended IE according to an embodiment of the present disclosure, which may be added to the NR downlink data delivery status PDU (PDU_TYPE_1) shown in Table 2.

TABLE 8

| Bits | | | | | | | | Number of octets |
|---|---|---|---|---|---|---|---|---|
| 7 | 6 | 5 | 4 | 3 | 2 | 1 | 0 | |
| PDU type (=1) | | | | Extended_IE type (0x00 or 0x01) | | Final Frame Ind. | Lost Packet Report | 1 |
| Highest successfully delivered PDCP Sequence Number | | | | | | | | 2 |
| Desired buffer size for the E-RAB | | | | | | | | 4 |
| Minimum desired buffer size for the UE | | | | | | | | 4 |
| Number of lost X2-U Sequence Number ranges reported | | | | | | | | 1 |
| Start of lost X2-U Sequence Number range End of lost X2-U Sequence Number range | | | | | | | | 4 × (Number of reported lost X2-U sequence number ranges) |
| TX_delivery_status_PDU_counter | | | | | | 0x00 | | 0 or 1 |
| Spare extension | | | | | | | | 0-4 |

According to the above-described embodiments of the present disclosure, end-to-end QoS of the terminal can be efficiently ensured through user plane data transfers between communication nodes in a multi-connection based mobile communication system which may also include at least one separated type base station.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a transmitting apparatus in a multi-connectivity based mobile communication system, the operation method comprising:
generating combined data by combining data and an extended information element (IE), when the data received from a serving gateway (SGW) or a core network is determined to be transmitted to a receiving apparatus;
transmitting the combined data to the receiving apparatus; and
receiving, from the receiving apparatus, feedback information indicating whether or not the receiving apparatus normally receives the combined data,
wherein the extended IE includes at least one of a maximum delivery status protocol data unit (PDU) interval IE (maximum_delivery_status_PDU_interval), a delivery status PDU counter IE (delivery_status_PDU_counter), and a transmission-completed packet 1E (TX_done_packet_information).

2. The operation method according to claim 1, further comprising, when the extended IE includes updated information for a maximum delivery status PDU interval, activating an acknowledgement (ACK) feedback waiting timer (ACK_feedback_waiting_timer) for the data.

3. The operation method according to claim 2, further comprising, when the feedback information indicates an ACK, stopping the ACK feedback waiting timer for the combined data and deleting the combined data from a buffer.

4. The operation method according to claim 1, wherein the feedback information is included in a delivery status PDU received from the receiving apparatus.

5. The operation method according to claim 4, further comprising:
when the delivery status PDU includes a delivery_status_PDU_counter configured by the receiving apparatus, storing the delivery_status_PDU_counter;
comparing the stored delivery_status_PDU_counter with a delivery status PDU counter of a delivery status PDU subsequently received from the receiving apparatus;
determining whether the subsequently-received delivery status PDU is a new delivery status PDU or not based on a result of the comparing; and
in response to determining that the subsequently-received delivery status PDU is a new delivery status PDU, updating the deliver status PDU counter.

6. The operation method according to claim 4, further comprising:
when the feedback information included in the delivery status PDU indicates a negative acknowledgement (NACK), determining whether to retransmit the data directly to a terminal; and
when the data is determined to be retransmitted directly to the terminal, stopping the ACK feedback waiting timer and transmitting to the terminal the data to which the transmission-completed packet 1E is added.

7. The operation method according to claim 6, further comprising, when the ACK feedback waiting timer expires, updating the transmission-completed packet 1E and retransmit the data to the terminal.

8. The operation method according to claim 1, wherein the data transmitted to the receiving apparatus is transmitted through at least one of an X2 interface, an Xn interface, and a new radio user plane (NR-U) interface.

9. An operation method of a receiving apparatus in a multi-connectivity based mobile communication system, the operation method comprising:
 identifying a type of an extended information element (IE) of data received from the transmitting apparatus;
 updating feedback information indicating whether or not the data is normally received, by determining whether or not a data loss exists based on a sequence number of the data;
 when the data loss is not identified based on the determining, activating a next feedback transmission timer and triggering a feedback indicating whether or not the data is normally received,
 when a data loss is identified based on the determining, activating a discard timer for data in which the data loss occurs; and
 when the discard timer expires, deleting a negative acknowledgement (NACK) feedback information for the data in which the data loss occurs.

10. The operation method according to claim 9, wherein the data is received from the transmitting apparatus through at least one of an X2 interface, an Xn interface, and a new radio user plane (NR-U) interface.

11. The operation method according to claim 9, further comprising:
 when the next feedback transmission timer expires or the feedback indicating whether or not the data is normally received is triggered, stopping the next feedback transmission timer; and
 transmitting a new delivery status protocol data unit (PDU) to the transmitting apparatus.

12. The operation method according to claim 9, further comprising:
 when the extended IE includes a transmission delivery status PDU counter IE, determining whether a value of the transmission delivery status PDU counter IE is identical to a value of a previous transmission delivery status PDU counter;
 deleting previous NACK feedback information in response to determining that the value of the transmission delivery status PDU counter IE is identical to the value of the previous transmission delivery status PDU counter; and
 increasing the value of the transmission delivery status PDU counter by 1.

13. The operation method according to claim 9, further comprising, when the extended IE includes a transmission-completed packet IE (TX_done_packet_information), deleting information on data related to the transmission-completed packet IE.

14. The operation method according to claim 9, further comprising, when the extended IE includes a maximum delivery status PDU interval IE (maximum_delivery_status_PDU_interval), updating a maximum allowable feedback time.

15. A transmitting apparatus in a multi-connectivity based mobile communication system, the transmitting apparatus comprising at least one processor, a memory storing at least one instruction executed by the at least one processor, and a transceiver controlled by the at least one processor, wherein the at least one instruction is configured to:
 generate combined data by combining data and an extended information element (IE), when the data received from a serving gateway (SGW) or a core network is determined to be transmitted to a receiving apparatus;
 transmit the combined data to the receiving apparatus; and
 receive, from the receiving apparatus, feedback information indicating whether or not the receiving apparatus normally receives the combined data,
 wherein the extended IE includes at least one of a maximum delivery status protocol data unit (PDU) interval IE (maximum_delivery_status_PDU_interval), a delivery status PDU counter IE (delivery_status_PDU_counter), and a transmission-completed packet IE (TX_done_packet_information).

16. The transmitting apparatus according to claim 15, wherein the at least one instruction is further configured to, when the extended IE includes updated information for a maximum delivery status PDU interval, activate an acknowledgement (ACK) feedback waiting timer (ACK feedback waiting timer) for the data.

* * * * *